United States Patent [19]
Thereze

[11] Patent Number: 6,121,694
[45] Date of Patent: Sep. 19, 2000

[54] BACK-UP POWER SUPPLY SERVING TO COMPENSATE TEMPORARILY FOR MAIN POWER SUPPLY DEFICIENCY

[75] Inventor: Jean-Marie Thereze, Lannion, France

[73] Assignee: Alcatel, Paris, France

[21] Appl. No.: 08/985,272

[22] Filed: Dec. 4, 1997

[30] Foreign Application Priority Data

Dec. 5, 1996 [FR] France ................................ 96-14934

[51] Int. Cl.$^7$ ............................................ H02J 7/00
[52] U.S. Cl. .............................. 307/64; 307/66; 307/85; 323/273
[58] Field of Search ................................ 307/64, 65, 66, 307/80, 85, 86, 18, 23; 323/273

[56] References Cited

U.S. PATENT DOCUMENTS

| | | | |
|---|---|---|---|
| 4,543,522 | 9/1985 | Moreau | 323/303 |
| 4,560,887 | 12/1985 | Schneider | 307/66 |
| 4,729,083 | 3/1988 | Kyriakos | 363/53 |
| 4,779,037 | 10/1988 | LoCascio . | |
| 4,890,003 | 12/1989 | Seibert et al. | 307/66 |
| 5,111,058 | 5/1992 | Martin | 307/66 |
| 5,136,175 | 8/1992 | Losel | 307/66 |
| 5,277,363 | 1/1994 | Hart . | |
| 5,280,233 | 1/1994 | Poletto et al. | 323/269 |
| 5,796,182 | 8/1998 | Martin | 307/66 |
| 5,828,207 | 10/1998 | Saadeh | 323/281 |

FOREIGN PATENT DOCUMENTS

| | | |
|---|---|---|
| 0 501 418 A2 | 9/1992 | European Pat. Off. . |
| 2 262 003 | 6/1993 | United Kingdom . |

*Primary Examiner*—Jeffrey Gaffin
*Assistant Examiner*—Peter Zura
*Attorney, Agent, or Firm*—Sughrue, Mion, Zinn, Macpeak & Seas, PLLC

[57] ABSTRACT

The invention concerns a back-up power supply of the type serving to compensate temporarily for an absence of a DC input voltage (Ve) from a main power supply (15) by delivering a voltage that is higher than a threshold value (Vmin) to a load (10). The main power supply (15) delivers the DC input voltage (Ve) to the load (10) under normal operating conditions, the DC input voltage (Ve) being higher than the threshold value (Vmin), and lying in the range defined by a minimum input voltage (Ve1) and by a maximum input voltage (Ve2). The back-up power supply includes a capacitor (13) charged by the DC input voltage (Ve). According to the invention, the back-up power supply includes means (20, 21) for limiting the charge on the capacitor (13) to a reference voltage (Vr) that is lower than the maximum input voltage (Ve2). The invention makes it possible to reduce the size and the cost of the capacitor (13) of the back-up power supply.

6 Claims, 1 Drawing Sheet

BACK-UP POWER SUPPLY SERVING TO COMPENSATE TEMPORARILY FOR MAIN POWER SUPPLY DEFICIENCY

BACKGROUND OF THE INVENTION

1. Field of the Invention

The invention relates to power supply systems. The present invention relates more precisely to a back-up power supply of the type serving to compensate temporarily for main power supply deficiency. The invention is particularly applicable to DC-to-DC converters.

2. Description of the Related Art

FIG. 1 is a diagram summarizing a prior art power supply system.

The power supply system shown in FIG. 1 is designed to power a load 10, e.g. constituted by a DC-to-DC converter delivering an output voltage Vs on the basis of a DC input voltage Ve. The voltage Ve is generated by a main power supply 15 and it can vary over a range defined by a minimum input voltage Ve1 and by a maximum input voltage Ve2. The voltage Ve is applied to the load 10 via a diode 11. Under normal operating conditions, the load 10 is thus powered by the voltage Ve.

In order to mitigate a momentary absence of voltage Ve, e.g. resulting from a micro-interruption in power supply, a back-up power supply is provided constituted by a capacitor 13 pre-charged to the voltage Ve (ignoring the voltage drop through the diode 11) via a current-limiting resistor 12. When the voltage Ve becomes lower than the voltage stored in the capacitor 13, a diode 14 whose cathode is connected to the cathode of the diode 11 becomes conductive. The resistance of the diode 14 in the conductive state then becomes much lower than the resistance of the resistor 12, and the capacitor 13 discharges into the load 10 via the diode 14. The diode 11 thus makes it possible to prevent the capacitor 13 from discharging into the cell of the main power supply 15.

The problem posed by a back-up power supply of that type is that the nominal voltage of the capacitor 13 is chosen as a function of the maximum voltage Ve2 that can be reached by the input voltage Ve. By way of example, if the voltage Ve fluctuates over the range 18 volts to 36 volts, the capacitor 13 is chosen to withstand the nominal voltage immediately above 36 volts, i.e. 50 volts. However, the load 10 can operate correctly with a power supply voltage lower than the voltage Ve2, e.g. 15 volts. This applies typically to DC-to-DC converters operating (i.e. delivering a constant regulated output voltage Vs) over a wide range of input voltages, e.g. 15 volts to 36 volts. The minimum operating voltage (15 volts) is referred to as the "threshold value", and is referenced Vmin. In the event that the main power supply fails, the capacitor 13, which is charged to a voltage Vc equal to Ve prior to the power supply interruption, discharges continuously into the load 10 until the voltage delivered by the load 10 reaches Vmin. The duration dt during which the capacitor discharges from Vc to Vmin (ignoring the voltage drop through the diode 14) is the duration for which an absence of the voltage Ve is transparent for the load 10.

Unfortunately, the duration dt is not controllable, and in certain applications, it is longer than necessary. By way of example, when specifications specify that an absence of the main power supply Ve must be tolerated for 30 ms (typically a micro-interruption in power supply), it is not necessary to provide a back-up power supply making it possible for the load 10 to operate for any longer than specified because that involves providing an energy-storage capacitor 13 that is of larger volume, and costs more.

Another known solution consists in using a low-capacitance capacitor 13, and in charging it to a high voltage, e.g. by means of a boost circuit, or by means of an auxiliary winding of a transformer. The product C×V is then larger, and it makes it possible to obtain a longer sustain time.

Unfortunately, that solution is costly, and switching over is complex when going over from the main power supply to the back-up power supply.

SUMMARY OF THE INVENTION

A particular object of the present invention is to mitigate those drawbacks.

More precisely, one of the objects of the invention is to provide a back-up power supply that is smaller in size and lower in cost than the above-mentioned state of the art.

Another object of the invention is to provide such a back-up power supply whose duration for which it is designed to compensate for absence of the main power supply can be adjusted easily.

These objects, and others that appear below are achieved by means of a back-up power supply of the type serving to compensate temporarily for an absence of a DC input voltage from a main power supply by delivering a voltage that is higher than a threshold value to a load, the main power supply delivering the DC input voltage to the load under normal operating conditions, the DC input voltage being higher than the threshold value, and lying in the range defined by a minimum input voltage and by a maximum input voltage, the back-up power supply including a capacitor charged by the DC input voltage, and the back-up power supply including means for limiting the charge on the capacitor to a reference voltage that is lower than the maximum input voltage.

Thus, the capacitor is charged only to a voltage that is high enough to compensate for absence of the main power supply for a predetermined duration, and that is not dependent on the voltage Ve2. It is then not necessary for the capacitor to be overdimensioned in terms of the voltage that it must be able to withstand (rated nominal voltage), thereby improving compactness and lowering cost.

Preferably, the means for limiting the charge on the capacitor to a reference voltage lower than the maximum input voltage comprise switch-forming means.

Advantageously, the reference voltage is proportional to the minimum duration for which the load must be powered by a voltage higher than the threshold value in the event of absence of the DC input voltage.

In a preferred application, the load is constituted by a DC-to-DC converter.

In a preferred embodiment, the means for limiting the charge on the capacitor to a reference voltage lower than the maximum input voltage comprise a comparator for comparing the voltage across the terminals of the capacitor with the reference voltage, the comparator driving means enabling the capacitor to be charged.

The invention also provides a power supply system including such a back-up power supply.

BRIEF DESCRIPTION OF THE DRAWINGS

Other characteristics and advantages of the invention appear on reading the following description of a preferred embodiment given by way of non-limiting example, and of the accompanying drawings, in which:

FIG. 1 is described above with reference to the state of the art.

FIG. 2 is a diagram summarizing a power supply system of the invention. The elements identical to the elements shown in FIG. 1 are given the same reference numerals.

DETAILED DESCRIPTION OF THE PREFERRED EMBODIMENTS

Figure 1:
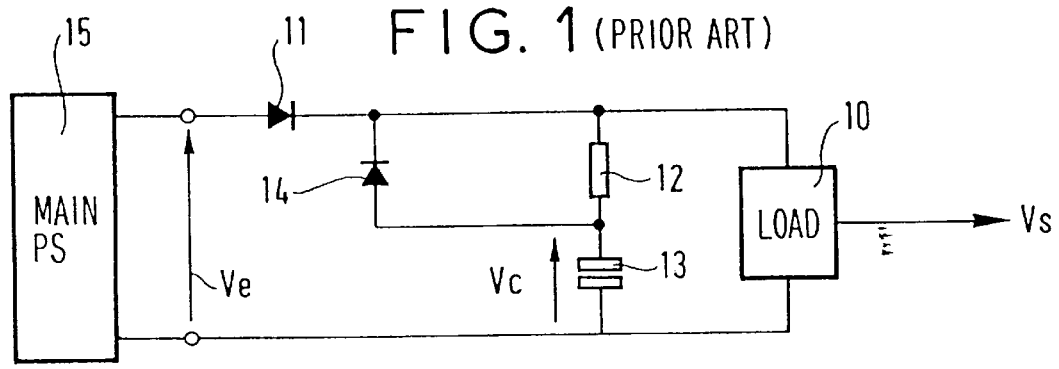
FIG. 1 is a diagram summarizing a prior art power supply system.

The invention differs from the state of the art shown in FIG. 1 in that the voltage Vc across the terminals of the capacitor 13 serving as an auxiliary power supply in the event of failure of the main power supply 15 is continuously compared with a reference voltage Vr lower than the voltage Ve2 and higher than the minimum voltage Vmin, for which the load 10 operates normally.

By way of example, based on the above numerical example, Vr=20 volts, Ve1=18 volts, Ve2=36 volts, and Vmin=15 volts. For example, the voltage Vr may be obtained by means of a Zener diode. A comparator 20 is used in this example to perform the comparison, the comparator 20 driving means 21 making it possible to charge the capacitor 13. These means 21 are represented in the form of a switch, and in practice, they are implemented in the form of a transistor. When the voltage across the terminals of the capacitor 13 is lower than the reference voltage Vr, the comparator 20 causes the switch 21 to close so as to charge the capacitor 13 via the resistor 12. When the voltage across the terminals of the capacitor 13 reaches the voltage Vr, the comparator 20 causes the switch 21 to be opened, so as to stop charging the capacitor 13.

In this way, the voltage Vc across the terminals of the capacitor 13 is made equal to the voltage Vr. In practice, a hysteresis is provided at the comparator 20 so as to avoid switching the switch 21 too frequently. When the main power supply voltage Ve becomes lower than the voltage Vr, the capacitor 13 guarantees continuity in the power supply to the load 10 via the diode 14.

Instead of being connected to the cathode of the diode 11, the resistor 12 may be connected to the anode thereof, so as not to be adversely affected by the voltage drop through the diode 11.

With the above-mentioned numerical values, the capacitor discharges as from 20 volts, given that the load 10 operates normally until the voltage applied to it becomes 15 volts. Thus, ignoring the voltage drop through the diode 14, the capacitor 13 provides a sufficient power supply to the load for a duration dt corresponding to the capacitor discharging from 20 volts to 15 volts. This duration dt is easy to adjust, as a function of the set specifications, by acting on the reference voltage Vr. The longer the required duration dt, the higher the voltage Vr. The value of the reference voltage Vr is thus adjusted as a function of the minimum duration dt for which the load 10 must be powered by a voltage greater than its threshold value Vmin.

In a preferred application, the load 10 is constituted by a DC-to-DC converter delivering a regulated output voltage Vs so long as a voltage higher than Vmin is present at its input.

It should be noted that the invention does make it possible to charge the capacitor 13 to a voltage level lower than the minimum input voltage Ve1, e.g. to 17 volts. In practice, the charging range of the capacitor 13 is Vmin to Ve2, but, as described above, the charging level of the capacitor 12 is intentionally lower than the voltage Ve2, and is proportional to the minimum duration dt for which the capacitor 13 must be able to mitigate the absence of the input voltage Ve.

Figure 2:
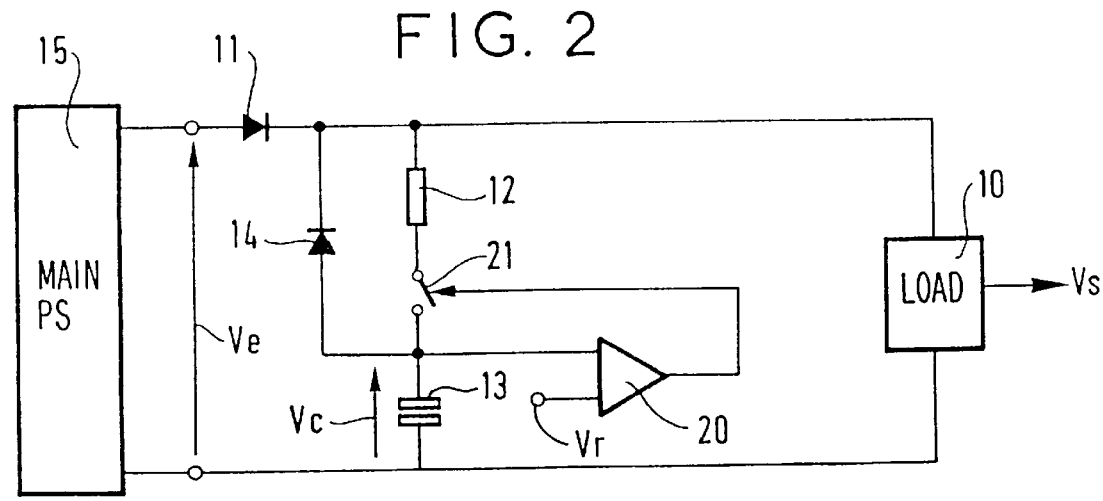
FIG. 2 is a diagram summarizing a power supply system of the invention.
Figure 3:
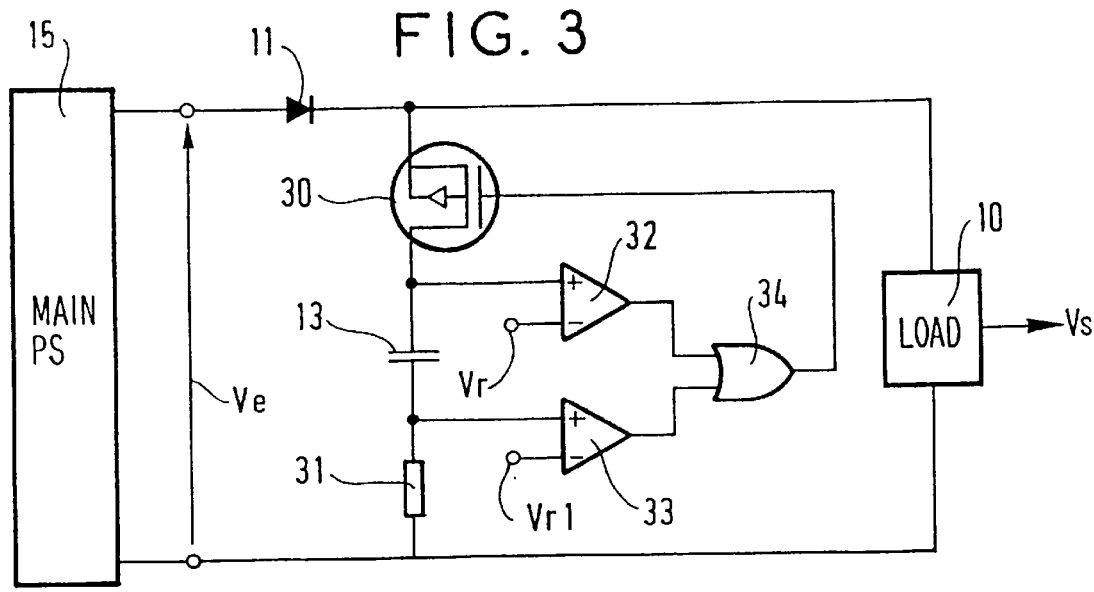
FIG. 3 is a diagram summarizing a variant embodiment of the system shown in FIG. 2.

FIG. 3 is a diagram summarizing a variant embodiment of the system shown in FIG. 2.

In this variant, a MOSFET 30 is used to charge the capacitor 13. The drain of the transistor 30 is connected to the capacitor 13, the other terminal of the capacitor 13 being connected to a resistor 31 of low resistance. Two comparators 32 and 33 are used in this example to cause the capacitor 13 to be charged and to discharge: a first comparator 32 compares the voltage across the terminals of the capacitor 13 with the above-mentioned reference voltage Vr, and a second comparator 33 compares a low reference voltage Vr1 (e.g. 20 mV) with the voltage across the terminals of the resistor 31. The outputs of the comparators 32 and 33 are connected to an OR function 34 whose output drives the transistor 30. The object of the comparator 32 is to limit the charging voltage of the capacitor 13 to the reference voltage Vr, while the function of the comparator 33 is to limit the charging current of the capacitor 13 (constant-current charging). The transistor 30 includes a forward diode enabling the capacitor 13 to discharge in the event of a momentary absence of voltage Ve, or when the charging current becomes too high.

In a variant embodiment, the source of the transistor 30 must be connected to the cathode of the diode 11. It should be noted that the MOSFET 30 may be replaced with a bipolar transistor connected in parallel with a diode for discharging the capacitor 13.

By charging the capacitor 13 to a limited voltage only, it is possible to reduce its size because the voltage across its terminals is independent of the maximum voltage Ve2 that can be reached by Ve. More precisely, when the sustain time dt required is sufficiently shorter than the sustain time that would have been obtained with a capacitor charged to the voltage Ve2, the designer of the power supply can choose a nominal capacitor operating voltage that is lower (e.g. 25 volts instead of 50 volts). Capacitor size is thus reduced by about one half, and cost is also reduced considerably.

I claim:

1. A back-up power supply of the type serving to compensate temporarily for an absence of a DC input voltage (Ve) from a main power supply (15) by delivering a voltage that is higher than a threshold value (Vmin) to a load (10), said main power supply (15) delivering said DC input voltage (Ve) to said load (10) under normal operating conditions, said DC input voltage (Ve) being higher than said threshold value (Vmin), and lying in the range defined by a minimum input voltage (Ve1) and by a maximum input voltage (Ve2), said back-up power supply including a capacitor (13) charged by said DC input voltage (Ve), said back-up power supply being characterized in that it includes means (20, 21) for limiting the charge on said capacitor (13) to a reference voltage (Vr) that is lower than said maximum input voltage (Ve2).

2. A back-up power supply according to claim 1, characterized in that said means (20, 21) for limiting the charge on said capacitor (13) to a reference voltage (Vr) lower than said maximum input voltage (Ve2) comprise interruption-forming means (21).

3. A back-up power supply according to claim 1, characterized in that said reference voltage (Vr) is proportional to the minimum duration for which said load (10) must be powered by a voltage higher than said threshold value (Vmin) in the event of absence of said DC input voltage (Ve).

4. A back-up power supply according to claim 1, characterized in that said load (10) is constituted by a DC-to-DC converter.

5. A back-up power supply according to claim 1, characterized in that said means (20, 21) for limiting the charge on said capacitor (13) to a reference voltage (Vr) lower than said maximum input voltage (Ve2) comprise a comparator (20) for comparing the voltage (Vc) across the terminals of said capacitor (13) with said reference voltage (Vr), said comparator (20) driving means (21) enabling said capacitor (13) to be charged.

6. A power supply system, characterized in that it includes a back-up power supply according to claim 1.

* * * * *